No. 801,437. PATENTED OCT. 10, 1905.
F. J. BAKER.
GUARD FOR FISH HOOKS.
APPLICATION FILED JUNE 13, 1905.

Witnesses  
Inventor  
Frank J. Baker  
By L. A. Gourick  
Attorney

UNITED STATES PATENT OFFICE.

FRANK J. BAKER, OF ST. CLOUD, MINNESOTA.

GUARD FOR FISH-HOOKS.

No. 801,437.      Specification of Letters Patent.      Patented Oct. 10, 1905.

Application filed June 13, 1905. Serial No. 265,037.

*To all whom it may concern:*

Be it known that I, FRANK J. BAKER, a citizen of the United States, residing at St. Cloud, in the county of Stearns, State of Minnesota, have invented certain new and useful Improvements in Guards for Fish-Hooks, of which the following is a specification.

My invention relates to attachments for fish-hooks for guarding its point to prevent it from being caught by weeds, stones, sunken logs, &c., in trolling or casting, and has for its object the provision of a guard formed of closely-coiled wire secured to the upper end of the hook and provided with a flared opening so positioned as to protect the point. This structure will not interfere with the operation of the hook when the fish seizes the bait, and at the same time the resilient nature of the guard prevents entanglement of the hook, as above stated, while its construction of coiled wire admits of its elongation so as to inclose the point of the hook in case of entanglement with grass or weeds or other obstructions through which the hook is not easily drawn.

The construction and advantages of my invention will be fully explained hereinafter and illustrated in the accompanying drawings, in which—

Figure 1:
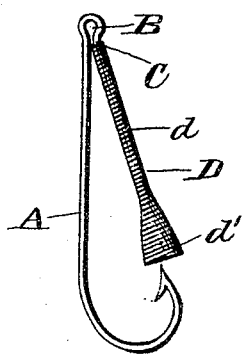
Figure 2:
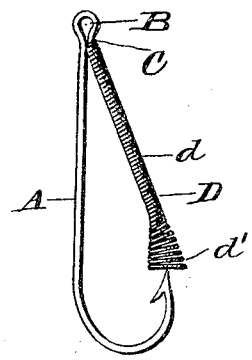

Figure 1 is a view of a fish-hook with my guard attached thereto, and Fig. 2 a view showing the position assumed by the guard when protecting the point of the hook when an obstruction is encountered.

In the drawings similar reference characters indicate corresponding parts in both views.

A represents a fish-hook of any ordinary form having an eye B formed at its upper end by bending the wire forming the hook back on itself and then extending it outward, as shown at C.

D represents the guard formed of coiled wire having the greater portion of its length closely coiled, as shown at $d$, with its end slipped over the part C and secured thereto. The free end of the guard is formed with an enlarged bell-shaped portion $d'$ with its mouth just in advance of the point of the hook A.

The bell-shaped mouth $d'$ is so constructed and positioned that it shields the point of the hook on all sides, while, as explained above, the construction of the guard of coiled wire admits of its elongation, so that the bell-shaped portion $d'$ is drawn down and incloses the point when a serious obstruction is encountered, the latter feature being illustrated in Fig. 2.

Having thus described my invention, what I claim is—

1. A guard for fish-hooks consisting of a spring-arm capable of elongation to cover the point of the hook, substantially as shown and described.

2. A guard for fish-hooks made of coiled wire and secured to the hook, substantially as shown and described.

3. A guard for fish-hooks made of coiled wire secured to the hook and having its free end formed with a bell-shaped portion, substantially as shown and described.

4. In combination with a fish-hook having its end bent back on itself to form an eye and bent outwardly from the shank of the hook, a guard formed of coiled wire secured to said outwardly-bent portion and provided with an enlarged, bell-shaped portion so positioned as to guard the point of the hook, substantially as shown and described.

In testimony whereof I hereto affix my signature in the presence of two witnesses.

FRANK J. BAKER.

Witnesses:
    J. I. DONOHUE,
    J. E. C. ROBINSON.